W. F. SPOEHR.
BORING AND FACING BAR.
APPLICATION FILED SEPT. 29, 1913.
1,131,871.
Patented Mar. 16, 1915.
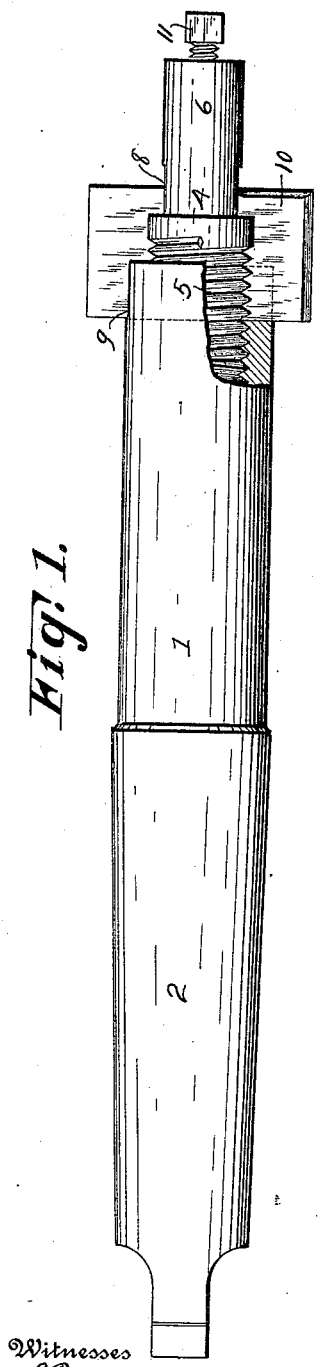
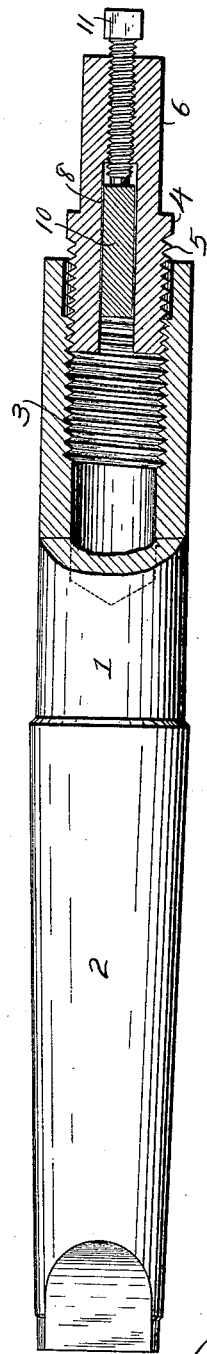
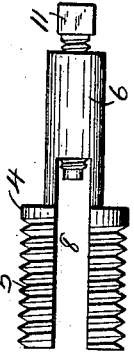
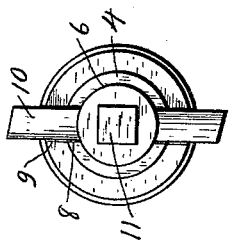
Witnesses
Inventor
William F. Spoehr
By Erwin E. Wheeler
Attorneys

UNITED STATES PATENT OFFICE.

WILLIAM F. SPOEHR, OF MILWAUKEE, WISCONSIN.

BORING AND FACING BAR.

1,131,871.  Specification of Letters Patent.  Patented Mar. 16, 1915.

Application filed September 29, 1913. Serial No. 792,311.

*To all whom it may concern:*

Be it known that I, WILLIAM F. SPOEHR, a citizen of the United States, residing at Milwaukee, county of Milwaukee, and State of Wisconsin, have invented new and useful Improvements in Boring and Facing Bars, of which the following is a specification.

My invention relates to improvements in boring and facing bars.

The object of my invention is to provide a form of bar which can be used for differing kinds of work, particularly for articles in which the centering holes or sockets vary in size and for work which requires cutters of different sizes in successive operations.

In the drawings Figure 1 is a side view of a facing bar embodying my invention with a portion of the shank partially broken away. Fig. 2 is a similar view, showing the socketed portion of the shank and the removable member in longitudinal section. Fig. 3 is a view of my improved facing bar as seen from the outer end. Figs. 4 and 5 are detail views showing two removable members having centering or bearing portions which differ in size, said members being interchangeable in the bar as shown in Figs. 1 and 2.

Like parts are identified by the same reference characters throughout the several views.

The bar 1 is provided with a tapered shank 2 of ordinary type adapted to fit the spindle of a drill press or boring machine. The outer end of the bar 1 is provided with an internal screw threaded socket 3. A removable member 4 is provided with a screw threaded shank 5, adapted to fit the socket 3 and the outer end of this removable member is provided with a bearing or centering shank 6, adapted to enter a previously formed socket or aperture in the work.

It will be observed that the member 4 is provided with an open ended slot 8 extending inwardly from its inner or screw threaded end portion 5. The bar 1 is provided with a similar slot 9 extending inwardly from its outer end, as indicated in Fig. 1. The cutter plate 10 is adapted to be received in the slots 8 and 9 and is forced inwardly to the base of the slot 9 by a screw 11, which projects longitudinally through the outer end portion of the shank 6 of member 4 and enters the slot 8 in a position to bear upon the outer margin of the cutter plate 10.

With the above described construction, it is not necessary to remove the bar from the spindle of the drill press or other actuating machine to which it is applied, when substituting one class of work for another, both of which require a boring or facing operation but in which the bearing socket or aperture differs in size from that of the work previously faced. On the contrary, it is merely necessary to unscrew the removable member 4 and substitute a member 4 having the bearing or centering member 6 of the required diameter. This is a great advantage for the reason that the tapered shanks 2 necessarily bind rigidly in the spindles of drill presses, etc., and it is therefore difficult and undesirable to remove them more often than necessary, considerable time being required to remove and replace them, and the danger of their working loose or wabbling in a spindle socket being correspondingly increased.

I claim—

1. A boring bar having its outer end provided with a screw threaded socket and an open ended transverse slot extending through the socketed end portion, a removable centering member having a screw threaded inner end portion and provided with a transverse open ended slot adapted for registry with the slot in said bar, a cutter blade adapted to fit said slots, and means for binding said cutter blade therein.

2. A boring bar having its outer end provided with a screw threaded socket and an open ended transverse slot extending through the socketed end portion, a removable centering member having a screw threaded inner end portion and provided with a transverse open ended slot adapted for registry with the slot in said bar, a cutter blade adapted to fit said slots, and means for binding said cutter blade therein, comprising a set screw extending longitudinally inwardly from the outer end of said removable member and adapted to bear upon the outer margin of said cutter blade.

In testimony whereof I affix my signature in the presence of two witnesses.

WILLIAM F. SPOEHR.

Witnesses:
LEVERETT C. WHEELER,
IRMA D. BREMER.

Copies of this patent may be obtained for five cents each, by addressing the "Commissioner of Patents, Washington, D. C."